US012578071B2

(12) United States Patent
Kim et al.

(10) Patent No.: US 12,578,071 B2
(45) Date of Patent: Mar. 17, 2026

(54) LIGHTING DEVICE FOR VEHICLE HAVING HOLOGRAM PLATE, LENS, AND BEZEL

(71) Applicant: HYUNDAI MOBIS CO., LTD., Seoul (KR)

(72) Inventors: Do Hyung Kim, Yongin-si (KR); Min Ji Kim, Yongin-si (KR); Phil Su Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 18/921,280

(22) Filed: Oct. 21, 2024

(65) Prior Publication Data

US 2025/0251105 A1 Aug. 7, 2025

(30) Foreign Application Priority Data

Feb. 6, 2024 (KR) ........................ 10-2024-0018176

(51) Int. Cl.
*F21S 41/20* (2018.01)
*F21S 41/143* (2018.01)
*F21S 41/36* (2018.01)

(52) U.S. Cl.
CPC ........... *F21S 41/285* (2018.01); *F21S 41/143* (2018.01); *F21S 41/36* (2018.01)

(58) Field of Classification Search
CPC .............................. F21S 41/365; F21S 41/285
See application file for complete search history.

(56) References Cited

U.S. PATENT DOCUMENTS 5,347,435 A * 9/1994 Smith ................... F21S 43/237 362/253
5,455,747 A * 10/1995 Aoyama .................. G03H 1/30 362/545
11,485,276 B2 * 11/2022 Johnson ................. B60Q 1/503
2024/0302019 A1 * 9/2024 Hohmann ............ B60Q 1/0058

FOREIGN PATENT DOCUMENTS

| | | | | |
|---|---|---|---|---|
| DE | 102017117390 A1 | 2/2019 | | |
| DE | 102019124555 A1 | 3/2021 | | |
| EP | 4269182 A1 | 11/2023 | | |
| EP | 3943989 B1 | * 10/2025 | ............... G03H 1/02 | |
| FR | 3074129 A1 | 5/2019 | | |
| JP | H08235904 A | 9/1996 | | |
| JP | H0939653 A | 2/1997 | | |
| JP | H09185901 A | 7/1997 | | |
| JP | H1083707 A | 3/1998 | | |
| KR | 10-2023-0077201 A | 6/2023 | | |
| WO | 20170042345 A1 | 3/2017 | | |

OTHER PUBLICATIONS

Extended European Search Report issued on Mar. 27, 2025 in the corresponding European Patent Application No. 24203530.1.

* cited by examiner

*Primary Examiner* — Robert J May
(74) *Attorney, Agent, or Firm* — Morgan, Lewis & Bockius LLP

(57) ABSTRACT

Provided is a lighting device for a vehicle, which includes a housing, a lens configured to be attached to the housing and cover an opening provided in the housing, a light source configured to be installed in the housing and emit light to the inside of the housing, a bezel configured to be attached to the housing and positioned inside the housing, and a hologram plate configured to be positioned between the lens and the bezel, through which a three-dimensional hologram image is displayed.

10 Claims, 7 Drawing Sheets

LIGHTING DEVICE FOR VEHICLE HAVING HOLOGRAM PLATE, LENS, AND BEZEL

CROSS-REFERENCE TO RELATED APPLICATION

This application claims priority from and the benefit under 35 USC § 119 of Korean Patent Application No. 10-2024-0018176, filed on Feb. 6, 2024, in the Korean Intellectual Property Office, the entire disclosure of which is incorporated by reference for all purposes.

BACKGROUND

Field

Exemplary embodiments of the present disclosure relate to a lighting device for a vehicle and, more particularly, to a lighting device for a vehicle capable of utilizing grille lighting.

Description of the Related Art

In recent years, vehicle manufacturers have been attempting to compensate for the reduced visual density of electric vehicle fronts with differentiated lighting images, incorporating unexpected effects in place of the grille on electric vehicles to add new value, and investing heavily in 3D stereoscopic grille lighting for eye-catching visual effects.

Conventionally, there have been limitations in grille lighting content and technological implementation solutions that effectively express brand identity. As the lighting area expands to include the grille, various issues have arisen, including increased development and production costs, as well as weight gain due to the use of multiple lighting devices. Therefore, these limitations and issues require improvement.

The related art of the present disclosure is disclosed in Korean Patent Application Publication No. 10-2023-0077201 (published on Jun. 1, 2023 and entitled "The lighting grille for the electric vehicle").

SUMMARY

Various embodiments of the present disclosure are directed to a lighting device for a vehicle capable of providing a three-dimensional image to drivers, surrounding vehicles, and pedestrians by utilizing grille lighting.

According to the present disclosure, a lighting device for a vehicle includes a housing, a lens configured to be attached to the housing and cover an opening provided in the housing, a light source configured to be installed in the housing and emit light to the inside of the housing, a bezel configured to be attached to the housing and positioned the inside of the housing, and a hologram plate configured to be positioned between the lens and the bezel, through which a three-dimensional hologram image is displayed.

Light from the light source may be emitted toward the hologram plate.

The lighting device for a vehicle may further include a reflector configured to be installed the inside of the housing and reflect light emitted from the light source toward the hologram plate.

The reflector may include a first reflector configured to be positioned facing the light source and reflect light emitted from the light source and a second reflector configured to be positioned facing the first reflector and reflect reflected light emitted from the first reflector toward the hologram plate.

The second reflector may have one or more reflection surfaces having a parabolic curved shape.

The lens may further include an emblem.

The hologram plate may be installed inside the housing, through which the three-dimensional hologram image is generated when the light source is turned on.

The hologram plate may receive light emitted from the light source, through which the three-dimensional hologram image that matches a shape of the emblem is displayed.

The bezel may further include a pattern visible from an outside through the lens.

The housing may be mounted to a grille provided on a front surface of a vehicle body.

The lighting device for a vehicle according to the exemplary embodiments of the present disclosure may project virtual grille lighting content as a 3D stereoscopic image through the integration of the hologram plate and the grille lighting structure, which cannot be achieved with injection-molded parts.

The lighting device for a vehicle according to the exemplary embodiments of the present disclosure may reduce vehicle weight and production costs by replacing various designs of lens shapes and injection-molded parts with hologram images.

The lighting device for a vehicle according to the exemplary embodiments of the present disclosure may have a distinct competitive advantage by providing images both when turned on and when turned off.

In addition, the lighting device for a vehicle according to the exemplary embodiments of the present disclosure may apply a holographic effect between external design elements, such as a garnish or the emblem, and internal design elements, such as the pattern and lighting patterns on the bezel. This application generates a more three-dimensional and unpredictable lighting image, thereby enhancing premium appeal.

DETAILED DESCRIPTION

Figure 1:
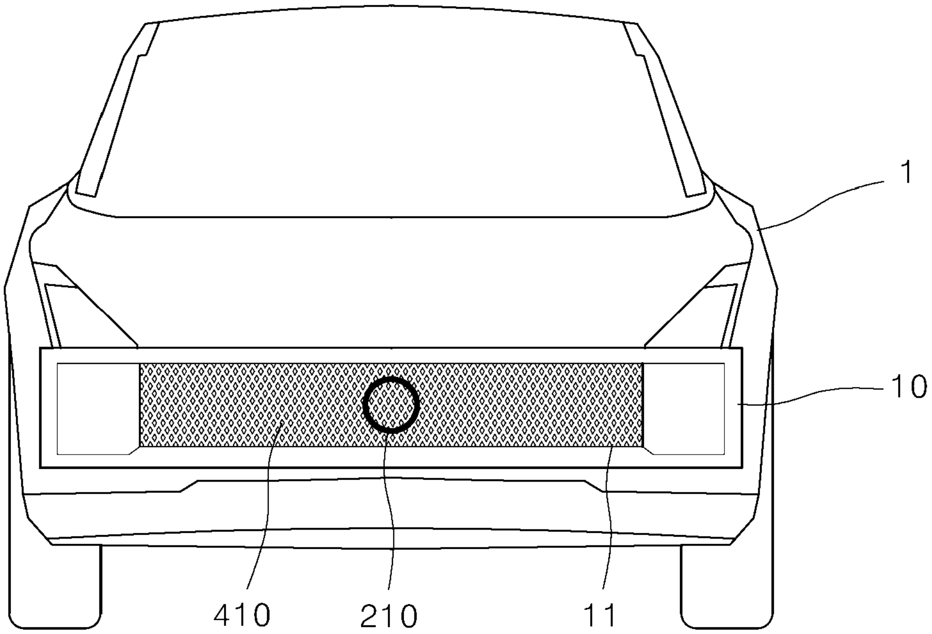
FIG. 1 is a front view of a lighting device for a vehicle according to an embodiment of the present disclosure when a light source is turned off, viewed from a front of a vehicle body.

Embodiments of a lighting device for a vehicle according to the present disclosure will be described hereinafter with reference to the accompanying drawings. For clarity and convenience in description, thicknesses of lines, sizes of constituent elements, and the like may be illustrated in a non-exact proportion in the drawings. In addition, the terms used below are defined in consideration of the functions thereof in the present disclosure and may vary depending on the intention of a user or an operator or common practice. Therefore, these terms should be contextually defined in light of the present specification.

Figure 2:
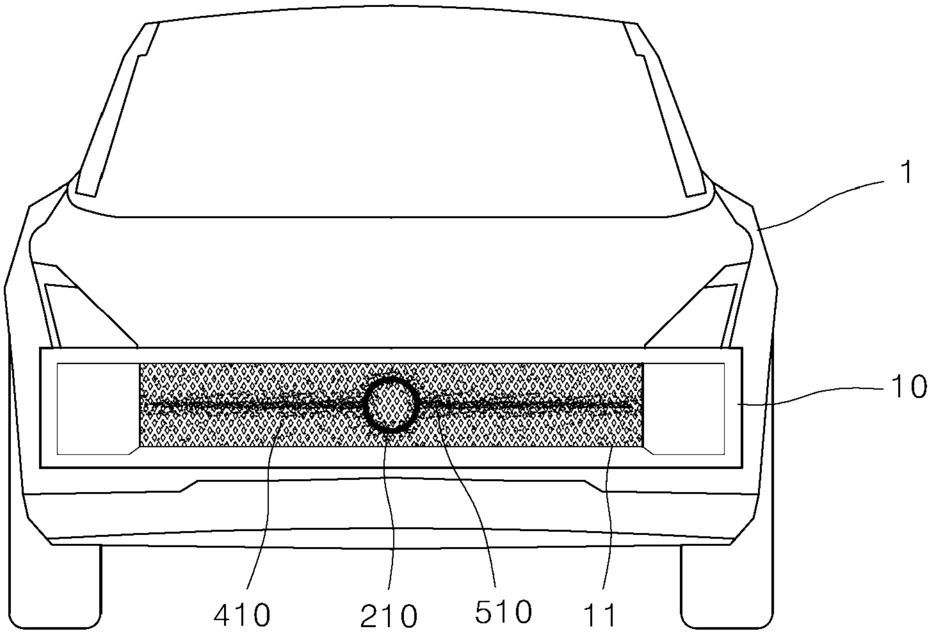
FIG. 2 is a front view of a lighting device for a vehicle according to the embodiment of the present disclosure when a light source is turned on, viewed from a front of a vehicle body.
Figure 3:
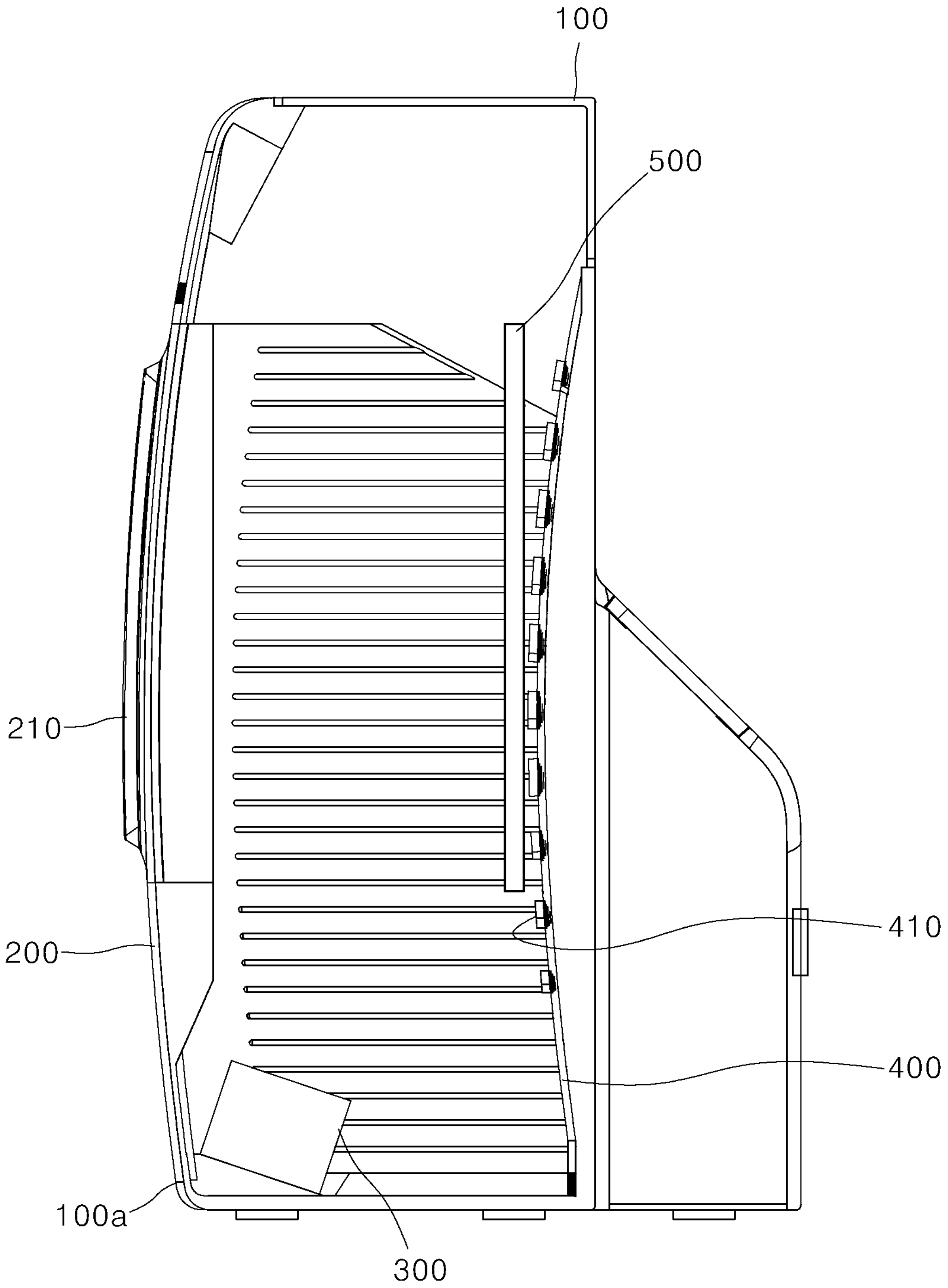
FIG. 3 is a cross-sectional view of a lighting device for a vehicle according to the embodiment of the present disclosure.
Figure 4:
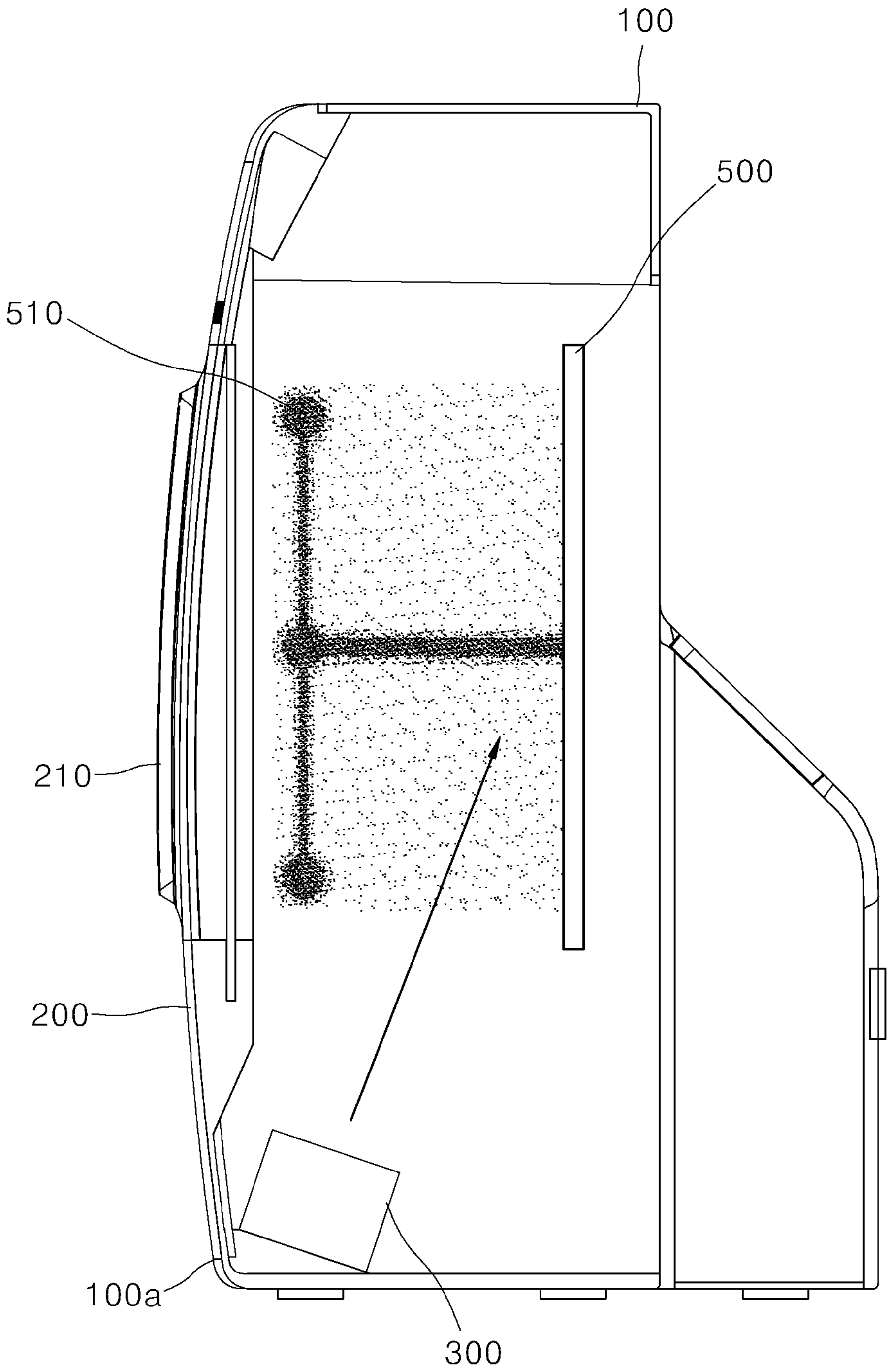
FIG. 4 is an exemplary diagram showing a path of light in FIG. 3.

FIG. 1 is a front view of a lighting device for a vehicle according to an embodiment of the present disclosure when a light source is turned off, viewed from a front of a vehicle body. FIG. 2 is a front view of a lighting device for a vehicle according to the embodiment of the present disclosure when a light source is turned on, viewed from a front of a vehicle body. FIG. 3 is a cross-sectional view of a lighting device for a vehicle according to the embodiment of the present disclosure. FIG. 4 is an exemplary diagram showing a path of light in FIG. 3.

Referring to FIGS. 1 to 4, a lighting device for a vehicle according to an embodiment of the present disclosure includes a housing 100, a lens 200, a light source 300, a bezel 400, and a hologram plate 500, which are described in detail as follows.

The housing 100 may be mounted to a vehicle body 1. The housing 100 may be mounted to a grille 11 provided on a front surface 10 of the vehicle body 1. In this case, the grille 11 may refer to a part of the front surface 10 of the vehicle body 1 where a radiator grille is mounted.

The housing 100 may have a box shape and be formed with an open front surface facing the front of the vehicle body 1.

The lens 200 may be attached to the housing 100. The lens 200 may be substantially plate-shaped, and its rim may be securely attached to the housing 100, fully encircling the bezel 400.

The lens 200 may have a planar or curved shape to match a shape of an opening 100*a* provided in the housing 100. The lens 200 may cover the opening 100*a* provided in the front surface of the housing 100.

The lens 200 may be exposed to the outside and be made of a transparent material that transmits light. For example, the lens 200 may include plastics such as polycarbonate.

The lens 200 may have an emblem 210. The emblem 210 may be provided on an outer surface of the lens 200 facing the front of the vehicle body 1. The emblem 210 may be integrally formed with the lens 200 or attached to the lens 200. The emblem 210 may be formed in an embossed shape protruding from the lens 200.

The emblem 210 may be visible from the outside. The emblem 210 may be visible from the outside when the light source 300 is turned on and when the light source 300 is turned off, which will be described below.

The light source 300 may be installed in the housing 100. The light source 300 may be housed inside the housing 100. The light source 300 may be positioned between the lens 200 and the hologram plate 500, which will be described below.

The light source 300 may be spaced apart from the hologram plate 500 and positioned facing a front surface of the hologram plate 500 facing the lens 200. The light source 300 may be positioned on an upper side or a lower side of the housing 100. In one embodiment of the present disclosure, the light source 300 is positioned on the lower side of the housing 100.

The light source 300 may emit light to the inside of the housing 100. Additionally, the light source 300 may emit light in the direction of the hologram plate 500.

The light source 300 may be positioned inclined at a set angle. The light source 300 may emit light at a set angle toward the upper side of the housing 100. In one embodiment of the present disclosure, the light source 300 emits light toward the front surface of the hologram plate 500 facing the lens 200, at an upwardly inclined angle to the housing 100. A path of light is indicated by an arrow.

The light source 300 may include a light emitting diode (LED) or a light amplification by stimulated emission of radiation (LASER).

The bezel 400 may be attached to the housing 100. The bezel 400 may be positioned inside the housing 100. The bezel 400 may be plate-shaped and be attached to an inner surface of the housing 100 facing the hologram plate 500. The bezel 400 may have the same shape as the lens 200.

The bezel 400 may have a pattern 410. The pattern 410 may be provided on an outer surface of the bezel 400 facing the direction of the lens 200. The pattern 410 may be integrally formed with the bezel 400 or attached to the bezel 400. The pattern 410 may be formed in an embossed shape protruding from the bezel 400.

The bezel 400 may have multiple patterns 410 in various shapes and/or sizes, arranged regularly or irregularly. The pattern 410 may include a lencell pattern.

The pattern 410 may be visible from the outside through the lens 200. For example, when the bezel 400 is black and the pattern 410 is white, the shape of the pattern 410 may be visible through the lens 200. The pattern 410 may be visible from the outside through the lens 200 when the light source 300 is turned on as shown in FIG. 2 and when the light source 300 is turned off as shown in FIG. 1.

The hologram plate 500 may be positioned between the lens 200 and the bezel 400. The hologram plate 500 may be spaced apart from the lens 200 and be positioned in front of the bezel 400.

A three-dimensional hologram image 510 may be displayed through the hologram plate 500. In one embodiment, the hologram plate 500 may have a shape of a transparent or translucent lens or film that transmits light or reflects light.

In another embodiment, the hologram plate 500 may include a transparent hologram lens and a hologram film. The hologram film is attached to the hologram lens, through which a three-dimensional hologram image 510 is generated when the light source is turned on.

The hologram plate 500 may be installed inside the housing 100, through which the three-dimensional hologram image 510 is generated when the light source 300 is turned on, as shown in FIG. 2. A three-dimensional image that appears to float in an internal space of the housing 100 may be generated through the hologram plate 500.

The hologram plate 500 may receive light emitted from the light source 300, through which the three-dimensional hologram image 510 that matches the shape of the emblem 210 is displayed. In particular, when the light source 300 is turned on, an optical illusion may create a dramatic effect.

Figure 5:
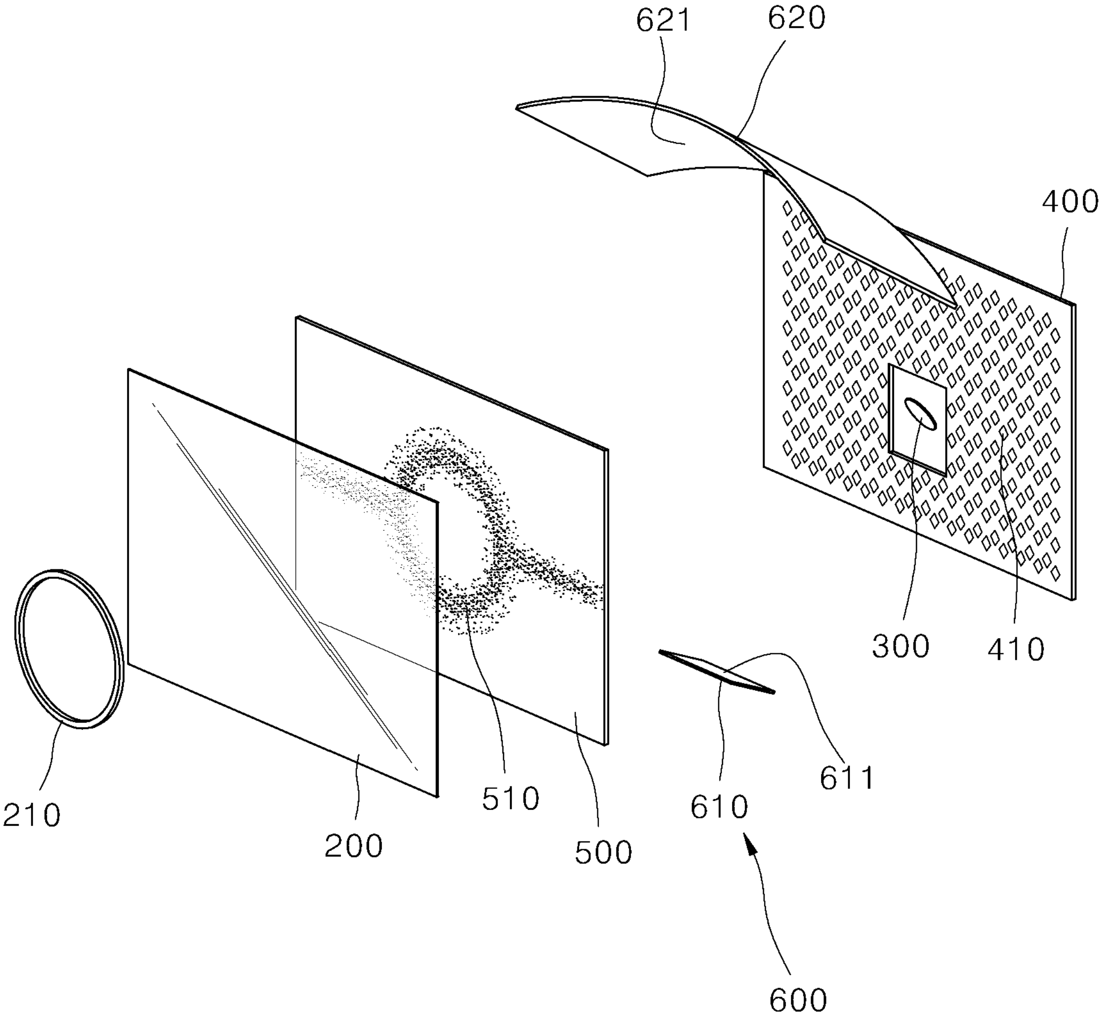
FIG. 5 is an exploded perspective view of a lighting device for a vehicle according to another embodiment of the present disclosure.
Figure 6:
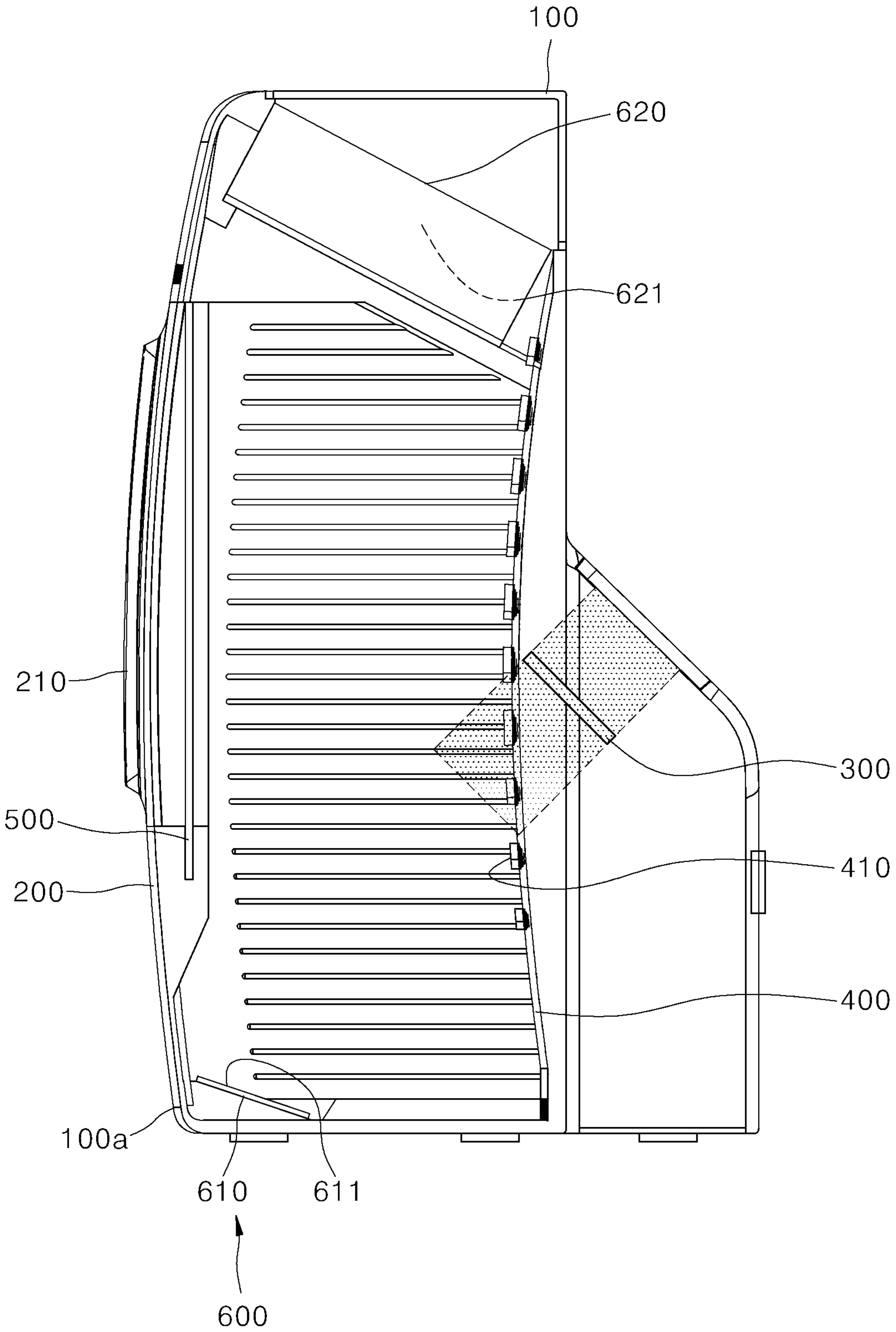
FIG. 6 is a cross-sectional view of a lighting device for a vehicle according to another embodiment of the present disclosure.
Figure 7:
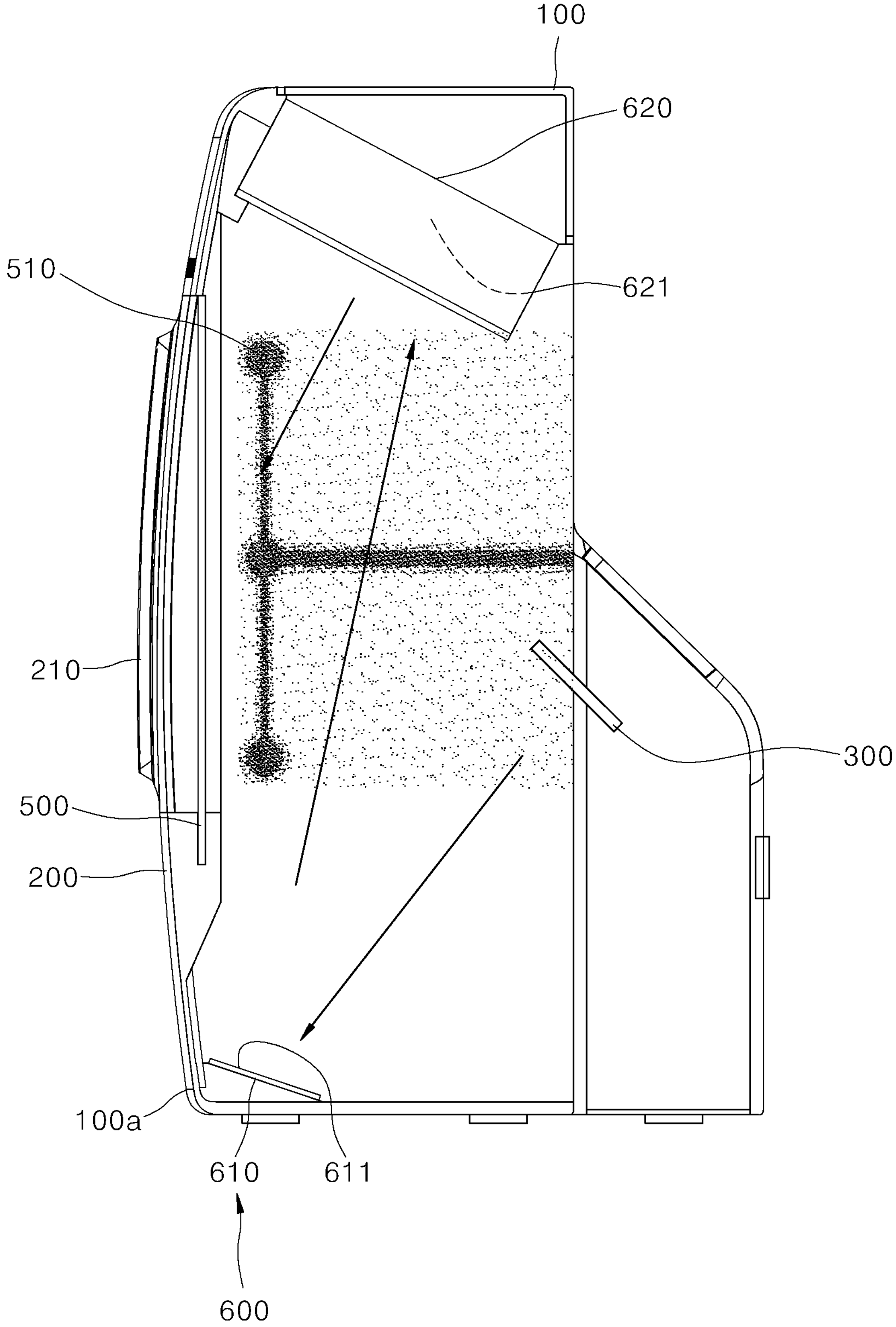
FIG. 7 is an exemplary diagram showing a path of light in FIG. 6.

FIG. 5 is an exploded perspective view of a lighting device for a vehicle according to another embodiment of the present disclosure. FIG. 6 is a cross-sectional view of a lighting device for a vehicle according to another embodiment of the present disclosure. FIG. 7 is an exemplary diagram showing a path of light in FIG. 6.

Referring to FIGS. 5 to 7, a light source 300 may be installed in a housing 100. The light source 300 may be spaced apart from a lens 200 and positioned facing the lens 200.

The light source 300 may be positioned inclined at a set angle. The light source 300 may emit light at a set angle toward an upper side or a lower side of the housing 100. In one embodiment of the present disclosure, the light source 300 emits light at a downwardly inclined angle to the housing 100.

A hologram plate 500 may be positioned between the lens 200 and a bezel 400. The hologram plate 500 may be spaced apart from the bezel 400 and be positioned behind the lens 200.

A lighting device for a vehicle according to another embodiment of the present disclosure may further include a reflector 600. The reflector 600 may be installed inside the housing 100.

The reflector 600 may reflect light emitted from the light source 300 toward the hologram plate 500. The internal space of the housing 100 may be reduced by the reflector 600 that reflects light emitted from the light source 300. A path of light is indicated by an arrow.

The reflector 600 may include a first reflector 610 and a second reflector 620.

The first reflector 610 may be housed inside the housing 100. The first reflector 610 may be positioned on an upper side or a lower side of the housing 100. In one embodiment of the present disclosure, the first reflector 610 is positioned on the lower side of the housing 100.

The first reflector 610 may be spaced apart from the light source 300 and be positioned facing the light source 300. The first reflector 610 may be positioned inclined at a set angle. The first reflector 610 may have a reflection surface 611 having a planar shape.

The first reflector 610 may reflect light emitted from the light source 300 toward the upper side of the housing 100. The first reflector 610 may reflect and diffuse light emitted from the light source 300.

The second reflector 620 may be installed inside the housing 100. The second reflector 620 may be spaced apart from the first reflector 610 and be positioned facing the first reflector 610. The second reflector 620 may be installed on an upper side of the housing 100.

The second reflector 620 may be positioned inclined at a set angle. The second reflector 620 may reflect reflected light emitted from the first reflector 610 toward the hologram plate 500. The second reflector 620 may have a reflection surface 621 having a parabolic curved shape.

The second reflector 620 may reflect reflected light emitted from the first reflector 610 toward the rear of the hologram plate 500 as parallel light. The hologram plate 500 may receive light emitted from the light source 300, through which a three-dimensional hologram image 510 that matches the shape of an emblem 210 is generated in a space between the hologram plate 500 and the bezel 400.

The lighting device for a vehicle according to the exemplary embodiments of the present disclosure may project virtual grille lighting content as a 3D stereoscopic image through the integration of the hologram plate 500 and the grille lighting structure, which cannot be achieved with injection-molded parts.

The lighting device for a vehicle according to the exemplary embodiments of the present disclosure may reduce vehicle weight and production costs by replacing various designs of the lens 200 shapes and injection-molded parts with hologram images.

The lighting device for a vehicle according to the exemplary embodiments of the present disclosure may have a distinct competitive advantage by providing images both when turned on and when turned off.

The lighting device for a vehicle according to the exemplary embodiments of the present disclosure may apply a holographic effect between external design elements, such as a garnish or the emblem 210, and internal design elements, such as the pattern 410 and lighting patterns on the bezel 400. This application may generate a more three-dimensional and unpredictable lighting image, thereby enhancing premium appeal.

Although the present disclosure has been described with reference to the embodiments illustrated in the drawings, the embodiments are for illustrative purposes only, and those skilled in the art will appreciate that various modifications and other equivalent embodiments can be made from these embodiments disclosed herein. Thus, the true technical scope of the present disclosure should be defined by the following claims.

What is claimed is:

1. A lighting device for a vehicle, the lighting device comprising:
- a housing;
- a lens configured to be attached to the housing and cover an opening provided in the housing;
- a light source configured to be installed in the housing and emit light to an inside of the housing;
- a bezel configured to be attached to the housing and positioned the inside of the housing; and
- a hologram plate configured to be positioned spaced apart from the lens and between the lens and the bezel, through which a three-dimensional hologram image is displayed,
- wherein the three-dimensional hologram image is displayed in an internal space of the housing between the lens and the hologram plate.

2. The lighting device of claim 1, wherein the light from the light source is emitted toward the hologram plate.

3. The lighting device of claim 1, further comprising:
- a reflector configured to be installed the inside of the housing and reflect the light emitted from the light source toward the hologram plate.

4. The lighting device of claim 3, wherein the reflector comprises:
- a first reflector configured to be positioned facing the light source and reflect the light emitted from the light source; and
- a second reflector configured to be positioned facing the first reflector and reflect reflected light emitted from the first reflector toward the hologram plate.

5. The lighting device of claim 4, wherein the second reflector has one or more reflection surfaces having a parabolic curved shape.

6. The lighting device of claim 1, wherein the lens further comprises an emblem.

7. The lighting device of claim 6, wherein the hologram plate is installed the inside of the housing, through which the three-dimensional holographic image is generated when the light source is turned on.

8. The lighting device of claim 7, wherein the hologram plate is configured to receive the light emitted from the light source, through which the three-dimensional hologram image that matches a shape of the emblem is displayed.

9. The lighting device of claim 1, wherein the bezel further comprises a pattern visible from an outside through the lens.

10. The lighting device of claim 1, wherein the housing is mounted to a grille provided on a front surface of a vehicle body.

* * * * *